US008644435B2

(12) United States Patent
Drooghaag et al.

(10) Patent No.: US 8,644,435 B2
(45) Date of Patent: Feb. 4, 2014

(54) METHODS AND DEVICES FOR DETECTING ELECTROMAGNETIC INTERFERENCE ON DATA TRANSMISSION LINES

(75) Inventors: Benoit Drooghaag, Ophain-Bois-Seigneur-Isaac (BE); Arnaud Bertrand, Nivelles (BE); Martin Dorme, Schaerbeek (BE)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/639,007

(22) PCT Filed: Apr. 26, 2011

(86) PCT No.: PCT/EP2011/056536
§ 371 (c)(1),
(2), (4) Date: Jan. 16, 2013

(87) PCT Pub. No.: WO2011/134936
PCT Pub. Date: Nov. 3, 2011

(65) Prior Publication Data
US 2013/0142237 A1 Jun. 6, 2013

(30) Foreign Application Priority Data

Apr. 30, 2010 (EP) ..................................... 10305467

(51) Int. Cl.
*H04L 25/08* (2006.01)
*H04L 1/00* (2006.01)
*H03D 1/04* (2006.01)
*H03D 1/06* (2006.01)
*H03K 5/01* (2006.01)
*H03K 6/04* (2006.01)

(52) U.S. Cl.
USPC ........... 375/346; 375/316; 375/324; 375/340; 375/345

(58) Field of Classification Search
USPC .......................... 375/316, 324, 340, 345, 346
See application file for complete search history.

(56) References Cited

U.S. PATENT DOCUMENTS

| 6,980,039 | B1* | 12/2005 | Dening et al. ................ 327/164 |
| 8,243,776 | B2* | 8/2012 | Tanaka et al. ................ 375/148 |
| 8,340,224 | B2* | 12/2012 | Norsworthy et al. ......... 375/316 |
| 2009/0252234 | A1 | 10/2009 | Samdani et al. |
| 2010/0034111 | A1 | 2/2010 | Rosenberg |

FOREIGN PATENT DOCUMENTS

WO    WO-2008094082 A1    8/2008

OTHER PUBLICATIONS

ITU-T Draft, Study Period 2005-2008, "An example of degradation of ADSL performance caused by 'REIN' from switch power supply," International Telecommunication Unioin, Sep. 2006.
International Search Report PCT/ISA/210 for International Application No. PCT/EP2011/056536 dated May 30, 2011.

* cited by examiner

*Primary Examiner* — Ted Wang
(74) *Attorney, Agent, or Firm* — Harness, Dickey & Pierce

(57) ABSTRACT

A method for remotely detecting electromagnetic interference on a data transmission line of a communication network includes measuring at a client site a noise power spectrum on the data transmission line as a function of frequency, for a frequency range. The noise is present when the data transmission line is not carrying a data signal. The method further includes forwarding the measured noise power spectrum to a remote computer at a network operator's site, determining periodicities in the measured power spectrum by the remote computer, and determining the switching frequency of a power supply unit at the client site by the remote computer based on periodicities in the power spectrum.

15 Claims, 4 Drawing Sheets

METHODS AND DEVICES FOR DETECTING ELECTROMAGNETIC INTERFERENCE ON DATA TRANSMISSION LINES

TECHNICAL FIELD OF THE INVENTION

The present invention relates to the field of methods and devices for resolving problems related to the impact of electromagnetic interference on data transmission lines, as for instance DSL lines.

BACKGROUND OF THE INVENTION

Power supply units (PSU) of many household appliances comprise switching converters, working at switching frequencies laying within the range of frequencies associated with DSL signals. Such switching converters are known to be a common source of electromagnetic interference (EMI) for in-house cabling networks (usually untwisted, low category cables) that carry for instance DSL signals. The DSL performance can degrade substantially because of such interference.

Today, the detection of Power Supply Unit related problems impacting a DSL line can only be performed by means of visual inspection by an expert of carrier data measured by the modem.

As this analysis can only be performed by an expert, it can only be performed after a customer complaint (reactive way), by the level 2 or 3 of customer support. It is not possible to have this analysis performed by first level customer support (having in general not the required technical skills) or in an automated, proactive way.

SUMMARY OF THE INVENTION

It is an object of the present invention to provide methods and devices for detecting electromagnetic interference on data transmission lines which solves at least one of the above problems.

This is achieved by the features of claims 1 and 11.

According to a first aspect of the present invention a method is disclosed for remotely detecting electromagnetic interference on a data transmission line of a communication network, in particular for electromagnetic interference caused by a power supply unit located at a client site, the power supply unit comprising a switching converter (e.g. a DC/DC or AC/DC convertor) having a switching frequency, comprising

- measuring at a client site a power spectrum of a noise signal on the data transmission line as a function of frequency, for a predetermined frequency range, the noise being present when the data transmission line is not carrying a data signal;
- forwarding the measured noise power spectrum to a remote computing means at a network operator's site;
- determining periodicities in the measured power spectrum by the remote computing means;
- determining the switching frequency of the power supply unit by the remote computing means, based on periodicities in the power spectrum.

According to embodiments of the first aspect of the present invention, the method further comprises determining a YIN estimator, the YIN estimator being defined as $$d'(\Delta f) = \begin{cases} 1, & \text{if } \Delta f = 0 \\ \dfrac{d(\tau)}{\frac{1}{\Delta f}\sum_{j=1}^{\Delta f} d(j)}, & \text{otherwise} \end{cases}$$

with $d(\Delta f) = \sum_{j=1}^{N}(x_j - x_{j+\Delta f})^2$ wherein $\Delta f$ is a frequency difference value, $x_j$ is the power spectrum value of the signal for discrete signal frequencies J, and N is the number of discrete signal frequencies within the predetermined width of the power spectrum of the signal;

determining the minimum value for the YIN estimator; associating the minimum value of the YIN estimator with the switching frequency of the power supply unit.

Preferably, said minimum value is the minimum value different from the value corresponding to frequency 0.

According to embodiments of the first aspect of the present invention, determining periodicities in the power spectrum comprises;

- determining an autocorrelation function for the measured power spectrum;
- determining the maximum of the autocorrelation function;
- associating the switching frequency of the power supply unit with the maximum of the autocorrelation function.

Preferably said maximum is the maximum different from the value corresponding to frequency 0.

According to embodiments of the first aspect of the present invention, determining periodicities in the power spectrum comprises;

- determining a cepstrum of the noise signal, the cepstrum being the square of the Fourier transform of the 10-based logarithm of the squared magnitude of the fourier transform of the noise signal;
- derive a frequency value corresponding to the largest peak value for the cepstrum;
- associating the switching frequency of the power supply unit with the frequency value.

Preferably the largest peak value is the largest peak value different from the value corresponding to frequency 0.

According to embodiments of the first aspect of the present invention, determining periodicities in the power spectrum comprises
a. detecting a set of peak values and associated peak frequencies in the power spectrum;
b. determining a set of difference values, the values consisting of the differences between each pair of frequencies of the set of peak frequencies;
c. counting the number of occurrences of similar difference values for the set of difference values;
d. associating the switching frequency of the power supply unit with the difference value which has the largest number of occurrences.

According to embodiments of the first aspect of the present invention, the predetermined frequency range comprises the whole power spectrum of the noise signal.

According to embodiments of the first aspect of the present invention, the method further comprises detecting which frequency range of signals on the line is impacted by the power supply unit, by performing any of the methods described before a plurality of times for a plurality of different frequency ranges of a predetermined width, the predetermined width being smaller than the width of the whole noise spectrum.

According to embodiments of the first aspect of the present invention, the method comprises detecting which frequency range of signals on the line is impacted by the power supply unit, comprising
determining a two-dimensional Yin estimator defined as;

$$d'(\Delta f, f_0) = \begin{cases} 1, & \text{if } \Delta f = 0 \\ \dfrac{d(\Delta f, f_0)}{\dfrac{1}{\Delta f}\sum_{j=1}^{N} d(j, f_0)}, & \text{otherwise} \end{cases}$$

$$\text{with } d(\Delta f, f_0) = \sum_{j=f_0}^{f_0+W} (x_j - x_{j+\Delta f})^2$$

wherein 11f is a frequency difference value, fo a start frequency, $x_j$ is the power spectrum value of the signal for discrete signal frequency j, and W is the width of the part of the power spectrum for which the YIN estimator is estimated, this width being smaller than the whole power spectrum of the noise signal;
determining a two-dimensional minimum value area of the two-dimensional estimator;
associating the two-dimensional minimum value area with the switching frequency of the power supply unit and with the frequency range which is impacted by the power supply unit.

According to embodiments of the first aspect of the present invention, the method comprises detecting which frequency range of signals on the line is impacted by the power supply unit, comprising
determining a two-dimensional Yin estimator defined as;

$$d'(\Delta f, f_0) = \begin{cases} 1, & \text{if } \Delta f = 0 \\ \dfrac{d(\Delta f, f_0)}{\dfrac{1}{\Delta f}\sum_{j=1}^{N} d(j, f_0)}, & \text{otherwise} \end{cases}$$

$$\text{with } d(\Delta f, f_0) = \sum_{j=f_0}^{f_0+k\Delta f} (x_j - x_{j+\Delta f})^2$$

wherein 11f is a frequency difference value, fo a start frequency, $x_j$ is the power spectrum value of the signal for discrete signal frequencies j, and k is a predetermined multiplication factor;
determining a two-dimensional minimum value area of the two-dimensional estimator;
associating the two-dimensional minimum value area with the switching frequency of the power supply unit and with the a frequency range which is impacted by the power supply unit.

According to embodiments of the first aspect of the present invention, the method comprises looking up the determined switching frequency in a predetermined information list, the list comprising information relating to predetermined types of power supply units and their associated switching frequencies, thereby identifying the type of the power supply unit.

According to embodiments of the first aspect of the present invention, the method comprises forwarding information regarding the type of power supply unit by the remote computing means to at least one client device on the client site.

According to embodiments of the first aspect of the present invention, the method comprises storing the switching frequencies for use in network management purposes.

According to a second aspect of the present invention a remote computing means is disclosed for detecting electromagnetic interference on a data transmission line of a communication network, in particular for electromagnetic interference caused by a power supply unit located at a client site, the power supply unit comprising a switching converter having a predetermined switching frequency, comprising
a reception means for receiving power spectrum measurements for a noise signal on a transmission line as a function of frequency for a predetermined frequency range from a client site, the noise signal being present when the transmission line is not carrying a data signal;
a calculation means for determining periodicities in the power spectrum measurements and for determining the switching frequency of the power supply unit, based on periodicities in the power spectrum.

According to embodiments of the second aspect of the present invention the remote computing means further comprises
a means for looking up the determined switching frequency in a predetermined information list, the list comprising information relating to predetermined types of power supply units and their associated switching frequencies, thereby identifying the type of the power supply unit.

According to embodiments of the second aspect of the present invention the remote computer means comprises a means for forwarding information regarding the type of power supply unit to at least one client device on the client site. Further aspects of the present invention are described by the dependent claims. The features from the dependent claims, features of any of the independent claims and any features of other dependent claims may be combined as considered appropriate to the person of ordinary skill, and not only in the particular combinations as defined by the claims.

BRIEF DESCRIPTION OF THE DRAWINGS

The accompanying drawings are used to illustrate embodiments of the present invention.

DESCRIPTION OF ILLUSTRATIVE EMBODIMENTS

The above and other advantageous features and objects of the invention will become more apparent and the invention will be better understood from the following detailed description when read in conjunction with the respective drawings.

Figure 1:
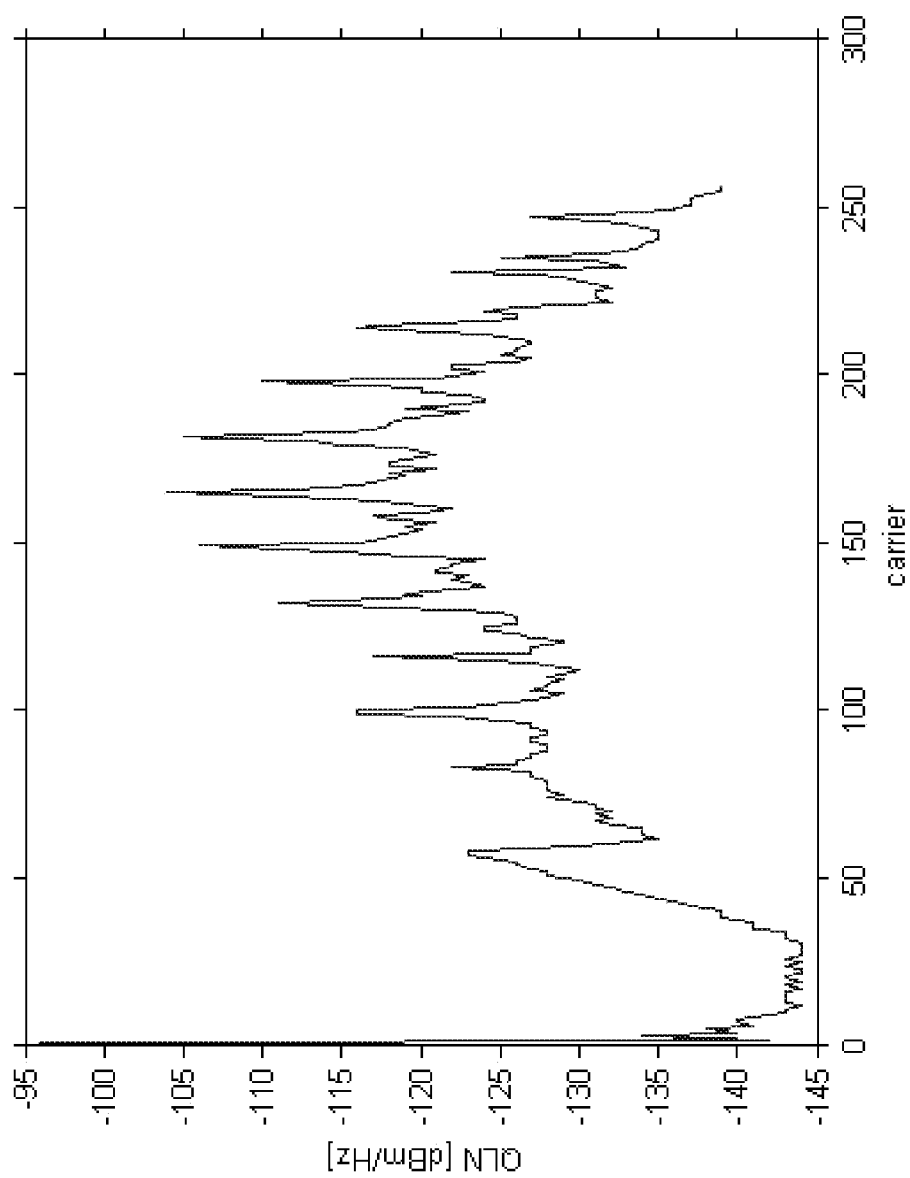
FIG. 1 is a graph illustrating a case wherein the interference of the power supply unit can be recognised visually in the power spectrum represented by the Quite-Line Noise (QLN).

As illustrated in FIG. 1, which represents a noise power spectrum graph as a function of frequency, more specifically a QLN graph, the main characteristic of PSU related interference is the periodicity in the affected frequencies. This can be explained by the fact that a PSU of switching type typically generates a square current waveform. The spectral content of the radiated interference is made of a fundamental frequency corresponding to the PSU switching frequency, and all of its harmonics.

Note that usually not all the harmonics are visible and that the fundamental frequency may also not be visible, for instance because of the PSU internal filter, or because the power level of the interference is smaller than the crosstalk level or the modem noise floor, being the level below which the modem cannot detect any signal (noise) The usual signature of a PSU impacting a DSL line is typically thus a sequence of harmonics, regularly spaced by a frequency interval equal to the PSU switching frequency.

In embodiments of the present invention methods and devices are disclosed that can automatically detect this interference and that can deduce the presence of an interfering PSU.

According to a first embodiment of the present invention, an algorithm is disclosed which is based on a list of perturbed carriers:

This algorithm comprises retrieving a list of the impacted carriers, corresponding to the peaks in a QLN graph.

This list for the measurements illustrated in FIG. 1 is for instance;

57, 83, 100, 116, 132, 149, 165, 182, 197, 214, 231, 235, 247

Nearly all the peaks are separated by a gap of around 16 tones (strictly the gap can be 15, 16 or 17 due to the frequency resolution of exactly 1 carrier).

This can be automatically detected, for instance by computing the carrier gaps between all the detected peaks and taking the most frequent value, preferably within a range of +1/−1 carrier.

First, a distance matrix is computed, i.e. a matrix that contains the differences of frequencies between all pairs of Radio Frequency Interferences (RFis). In this example, 13 RFis are detected. A 13×13 matrix is generated comprising the absolute differences between the frequencies.

TABLE 1

Distance matrix based on detected RFis.

|     | 57  | 83  | 100 | 116 | 132 | 149 | 165 | 182 | 197 | 214 | 231 | 235 | 247 |
| --- | --- | --- | --- | --- | --- | --- | --- | --- | --- | --- | --- | --- | --- |
| 57  | 0   | 26  | 43  | 59  | 75  | 92  | 108 | 125 | 140 | 157 | 174 | 178 | 190 |
| 83  | 26  | 0   | 17  | 33  | 49  | 66  | 82  | 99  | 114 | 131 | 148 | 152 | 164 |
| 100 | 43  | 17  | 0   | 16  | 32  | 49  | 65  | 82  | 97  | 114 | 131 | 135 | 147 |
| 116 | 59  | 33  | 16  | 0   | 16  | 33  | 49  | 66  | 81  | 98  | 115 | 119 | 131 |
| 132 | 75  | 49  | 32  | 16  | 0   | 17  | 33  | 50  | 65  | 82  | 99  | 103 | 115 |
| 149 | 92  | 66  | 49  | 33  | 17  | 0   | 16  | 33  | 48  | 65  | 82  | 86  | 98  |
| 165 | 108 | 82  | 65  | 49  | 33  | 16  | 0   | 17  | 32  | 49  | 66  | 70  | 82  |
| 182 | 125 | 99  | 82  | 66  | 50  | 33  | 17  | 0   | 15  | 32  | 49  | 53  | 65  |
| 197 | 140 | 114 | 97  | 81  | 65  | 48  | 32  | 15  | 0   | 17  | 34  | 38  | 50  |
| 214 | 157 | 131 | 114 | 98  | 82  | 65  | 49  | 32  | 17  | 0   | 17  | 21  | 33  |
| 231 | 174 | 148 | 131 | 115 | 99  | 82  | 66  | 49  | 34  | 17  | 0   | 4   | 16  |
| 235 | 178 | 152 | 135 | 119 | 103 | 86  | 70  | 53  | 38  | 21  | 4   | 0   | 12  |
| 247 | 190 | 164 | 147 | 131 | 115 | 98  | 82  | 65  | 50  | 33  | 16  | 12  | 0   |

Figure 4:
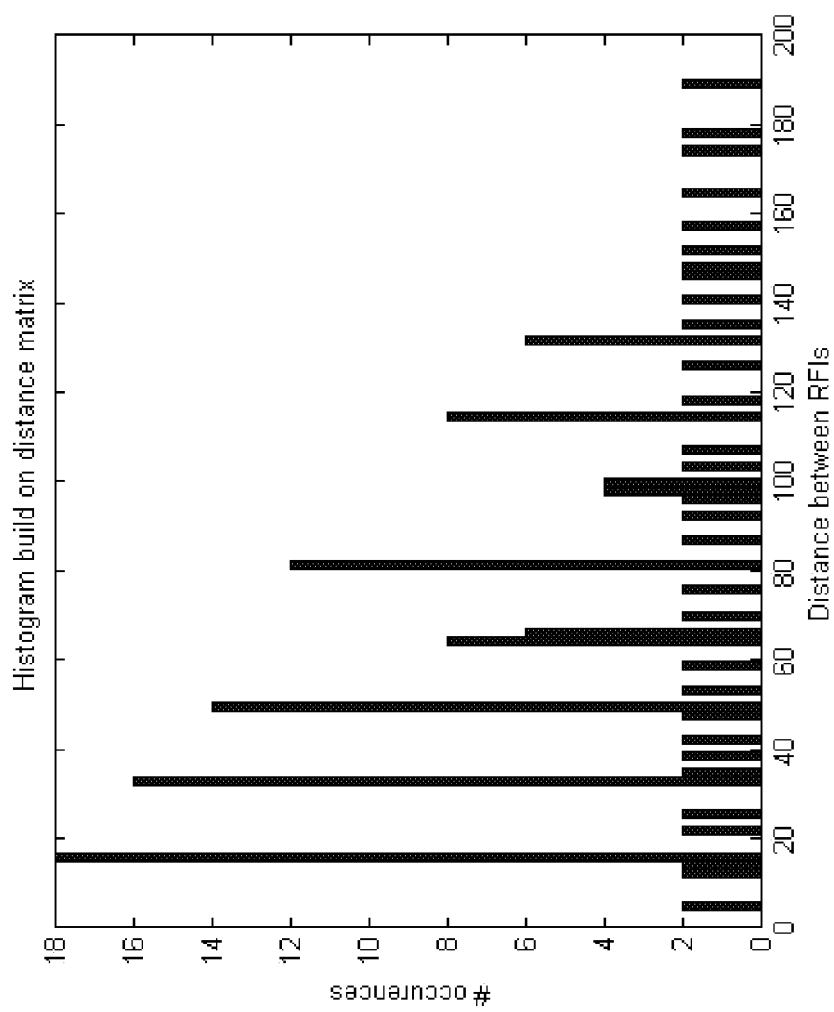
FIG. 4 illustrates a histogram used according to embodiment of the present invention.

Then a histogram is filled with the data comprised in the distance matrix (illustrated in FIG. 4). The maximum filling of the histogram occurs for a frequency distance of 16, and corresponds to the fundamental frequency of all the harmonics detected in the power spectrum, here the QLN.

In this example, it can be concluded that the DSL line is impacted by a PSU whose switching frequency is equal to 16 DSL carriers (16*4.3125 kHz=69 kHz); 4,3125 kHz being the frequency spacing between 2 adjacent DSL carriers.

According to a second embodiment of the present invention, use is made of the autocorrelation function of the power spectrum. This autocorrelation is defined by the formula:

$$AC(\Delta f) = \sum_j x_j \cdot x_{j-\Delta f}$$

with X=signal at frequency J, and $L_j-f$ is the difference in frequency.

By finding the maximum of the autocorrelation of the QLN, the presence of a repetitive pattern in the QLN can be detected and this corresponds or can be associated with the switching frequency of the PSU.

According to a third of embodiment, use is made of the power cepstrum of the noise signal. By definition, the power cepstrum of a signal is the square of the Fourier transform of the logarithm of the squared magnitude of the Fourier transform;

$$\text{Cepstrum}(x) = FT(\log(IFT(x)^2))^2$$

As the QLN is already the logarithm of the square magnitude of the Fourier transform on the noise, the cepstrum of the noise on a DSL line is given by the square of the Fourier transform on the QLN.

$$\text{Cepstrum} = FT(QLN)^2$$

Figure 2:
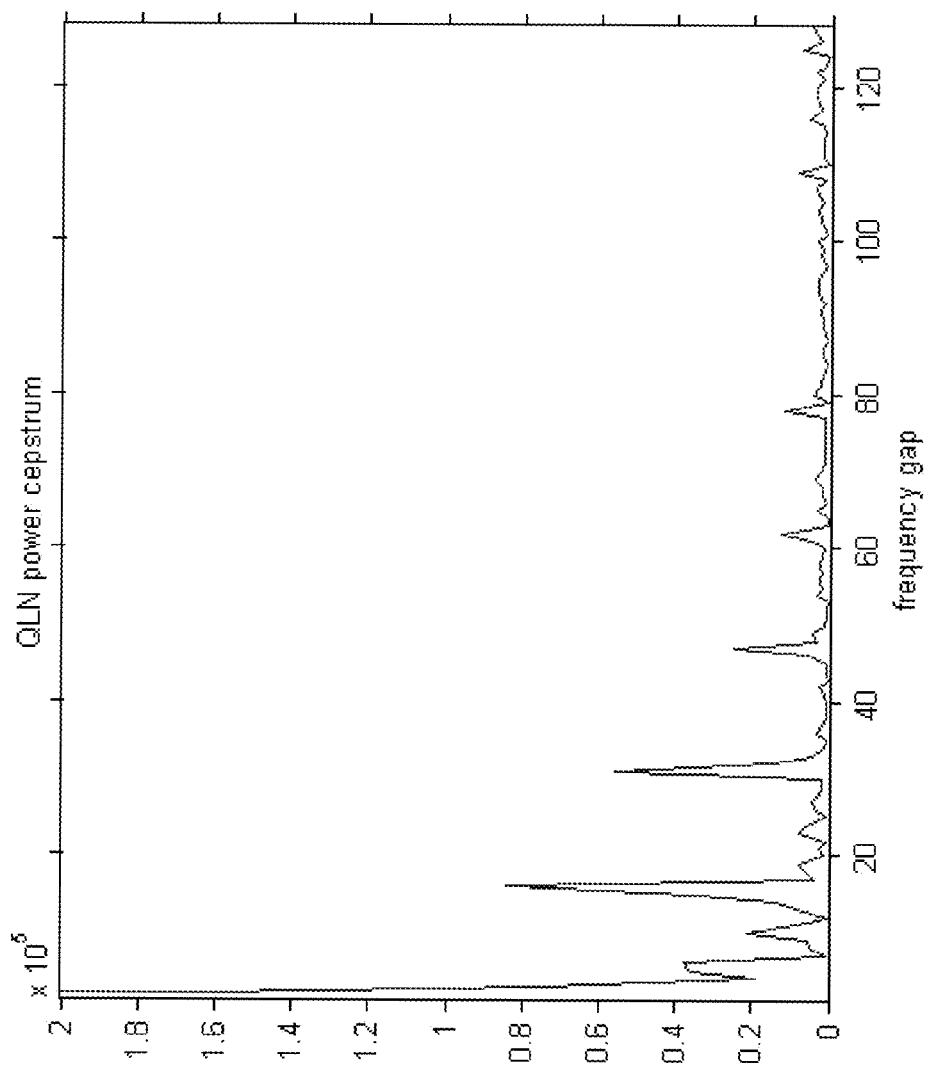
FIG. 2 shows a QLN power cepstrum graph.

Finding the maximum of the cepstrum is equivalent to finding the fundamental frequency of the signal. This is illustrated at the FIG. 2, which is the power cepstrum of the QLN showed at FIG. 1. As one can see, there is a peak at a frequency value of 16, which indeed corresponds to the fundamental frequency of the PSU impacting the DSL line.

According to a fourth embodiment, use can be made of a YIN estimator, defined by the following equations:

$$d'(\Delta f) = \begin{cases} 1, & \text{if } \Delta f = 0 \\ \dfrac{d(\tau)}{\frac{1}{\Delta f}\sum_{j=1}^{\Delta f} d(j)}, & \text{otherwise} \end{cases}$$

with $d(\Delta f) = \sum_{j=1}^{N} (x_j - x_{j+\Delta f})^2$

The second equation is a difference function between the signal and the same signal shifted by a certain frequency difference (f).

The first equation is the estimator function d'(f), and is a normalization by the cumulative mean of the difference function.

Finding the minimum of this estimator function allows determining a fundamental frequency of the input signal, which can be associated with the switching frequency of the PSU.

The main drawback of these embodiments, (as well as the embodiments which make use of the autocorrelation or cepstrum), is that they work well only if a substantial part of the input signal is impacted by the harmonics of the periodic noise. They do typically not allow localizing which frequency range on the signal is impacted by the electromagnetic interference.

To overcome this limitation, a fifth embodiment provides a modified version of the YIN estimator. Hereby, the difference function is calculated along a sliding window. The method comprises in choosing a window, the width of which is smaller than the signal width, applying the YIN estimator inside this window. The window is then shifted and the YIN estimator is computed in the shifted window. Then the window is shifted again etc., until the window reaches the end of the noise signal. This allows applying the algorithm for different starting points $f_0$, in a certain view as if the computation window slides over the input signal from left to right. The sliding window approach as described above can also be applied in the content of the autocorrelation embodiment or the cepstrum embodiment.

Mathematically, it can be formulated as $$d'(\Delta f, f_0) = \begin{cases} 1, & \text{if } \Delta f = 0 \\ \dfrac{d(\Delta f, f_0)}{\frac{1}{\Delta f}\sum_{j=1}^{N} d(j, f_0)}, & \text{otherwise} \end{cases}$$

with $d(\Delta f, f_0) = \sum_{j=f_0}^{f_0+W} (x_j - x_{j+\Delta f})^2$

In this algorithm based on a "sliding window", the window preferably comprises a sufficient number of the observed signal periods. A signal that varies slowly (long periodicity) would need a relatively large window to be observed.

To overcome this possible limitation, the method of a sixth embodiment makes the window width dependent of the frequency difference f. This can mathematically be expressed for instance by:

$$d'(\Delta f, f_0) = \begin{cases} 1, & \text{if } \Delta f = 0 \\ \dfrac{d(\Delta f, f_0)}{\frac{1}{\Delta f}\sum_{j=1}^{N} d(j, f_0)}, & \text{otherwise} \end{cases}$$

with $d(\Delta f, f_0) = \sum_{j=f_0}^{f_0+k\Delta f} (x_j - x_{j+\Delta f})^2$

Figure 3:
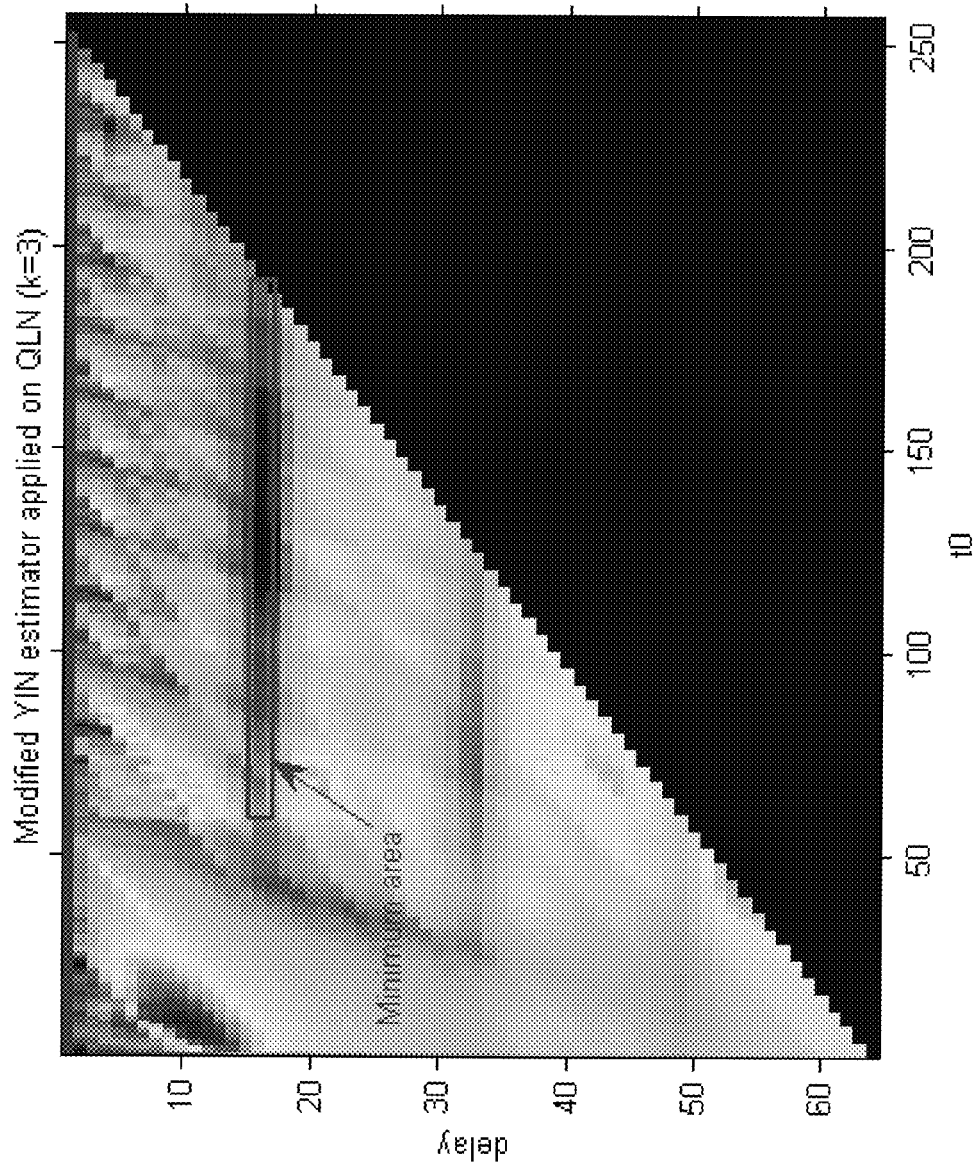
FIG. 3 illustrates the use of a two-dimensional estimator according to embodiments of the present invention.

The output of methods according to the fifth and sixth embodiment is a 2D space. Finding a minimum of this space allows determining the fundamental frequency of the disturbing signal, as well as localizing the impacted frequency range. This is illustrated for instance in FIG. 3.

The projection of the minimum area on the frequency axis gives the fundamental frequency (PSU switching frequency) The projection on the horizontal axis allows determining the portion of the power spectrum that is impacted.

It is an advantage of aspects of the present invention that electromagnetic interference can proactively be detected and analysed.

It is an advantage of aspects of the present invention that a PSU unit which is causing interference can be identified by looking up which PSU unit is present at the client site based on the determined PSU switching frequency and a list of switching frequencies of commercially available PSU's.

The list can for instance comprise information relating to the PSU of the DSL modem itself (or IPTV set-top box usually close to the DSL modem).

This information can then be provided to a client device at the client site. Based thereon the client may recognize a bad cable or may for instance displace the respective PSU to another location.

The interference frequency and/or associated PSU's can also be stored at a server on a network operator side for network management purposes. The information can then be forwarded at appropriate times, to a client.

While some embodiments described herein include some but not other features included in other embodiments, combinations of features of different embodiments are meant to be within the scope of the invention, and form different embodiments, as would be understood by the skilled person.

While the principles of the invention have been set out above in connection with specific embodiments, it is to be clearly understood that this description is merely made by way of example and not as a limitation of the scope of protection which is determined by the appended claims.

The invention claimed is:

1. A method for remotely detecting electromagnetic interference on a data transmission line of a communication network, in particular for electromagnetic interference caused by a power supply unit located at a client site, said power supply unit including a switching converter having a switching frequency, comprising:
   measuring at a client site a power spectrum of a noise signal on said data transmission line as a function of frequency, for a predetermined frequency range, said noise being present when said data transmission line is not carrying a data signal;
   forwarding said measured noise power spectrum to a remote computing means at a network operator's site;
   determining periodicities in said measured power spectrum by said remote computing means;
   determining the switching frequency of said power supply unit by said remote computing means, based on periodicities in said power spectrum.

2. A method according to claim 1, comprising:
   determining a YIN estimator, said YIN estimator being defined as $$d'(\Delta f) = \begin{cases} 1, & \text{if } \Delta f = 0 \\ \dfrac{d(\tau)}{\frac{1}{\Delta f}\sum_{j=1}^{\Delta f} d(j)}, & \text{otherwise} \end{cases}$$

with $d(\Delta f) = \sum_{j=1}^{N}(x_j - x_{j+\Delta f})^2$ wherein 11f is a frequency difference value, xj is the power spectrum value of the signal for discrete signal frequencies j, and N is the number of discrete signal frequencies within said predetermined width of the power spectrum of said noise signal;
determining the minimum value for said YIN estimator;
associating the minimum value of said YIN estimator with the switching frequency of said power supply unit.

3. A method according to claim 1, wherein determining periodicities in said power spectrum comprises:
determining an autocorrelation function for said measured power spectrum;
determining the maximum of said autocorrelation function;
associating said switching frequency of said power supply unit with the maximum of said autocorrelation function.

4. A method according to claim 1, wherein determining periodicities in said power spectrum comprises:
determining a cepstrum of said noise signal, said cepstrum being the square of the Fourier transform of the 10-based logarithm of the squared magnitude of the fourier transform of said noise signal;
deriving a frequency value corresponding to the largest peak value for said cepstrum;
associating said switching frequency of said power supply unit with said frequency value.

5. A method according to claim 1, wherein determining periodicities in said power spectrum comprises:
detecting a set of peak values and associated peak frequencies in said power spectrum;
determining a set of difference values, said values consisting of the differences between each pair of frequencies of said set of peak frequencies;
counting the number of occurrences of similar difference values for said set of difference values;
associating said switching frequency of said power supply unit with the difference value which has the largest number of occurrences.

6. A method according to claim 1, wherein said predetermined frequency range comprises the whole power spectrum of said noise signal.

7. A method according to claim 1, further comprising:
detecting which frequency range of signals on said line is impacted by said power supply unit, by performing the method according to claim 2 a plurality of times for a plurality of different frequency ranges of a predetermined width, said predetermined width being smaller than the width of said whole noise spectrum.

8. A method according to claim 1, further comprising:
detecting which frequency range of signals on said line is impacted by said power supply unit, including,
determining a two-dimensional Yin estimator defined as;

$$d'(\Delta f, f_0) = \begin{cases} 1, & \text{if } \Delta f = 0 \\ \dfrac{d(\Delta f, f_0)}{\dfrac{1}{\Delta f}\sum_{j=1}^{N} d(j, f_0)}, & \text{otherwise} \end{cases}$$

with $d(\Delta f, f_0) = \sum_{j=f_0}^{f_0+W}(x_j - x_{j+\Delta f})^2$ wherein 11f is a frequency difference value, fo a start frequency, Xj is the power spectrum value of the signal for discrete signal frequencies J, and W is width of the part of the signal for which the YIN estimator is computed, this width being smaller than the whole power spectrum of said noise signal;
determining a two-dimensional minimum value area of said two-dimensional estimator; and
associating said two-dimensional minimum value area with the switching frequency of said power supply unit and with said a frequency range which is impacted by said power supply unit.

9. A method according to claim 1, further comprising:
detecting which frequency range of signals on said line is impacted by said power supply unit, including,
determining a two-dimensional Yin estimator defined as;

$$d'(\Delta f, f_0) = \begin{cases} 1, & \text{if } \Delta f = 0 \\ \dfrac{d(\Delta f, f_0)}{\dfrac{1}{\Delta f}\sum_{j=1}^{N} d(j, f_0)}, & \text{otherwise} \end{cases}$$

with $d(\Delta f, f_0) = \sum_{j=f_0}^{f_0+k\Delta f}(x_j - x_{j+\Delta f})^2$ wherein 11f is a frequency difference value, fo a start frequency, Xj is the power spectrum value of the signal for discrete signal frequencies j, and k is a predetermined multiplication factor;
determining a two-dimensional minimum value area of said two-dimensional estimator;
associating said two-dimensional minimum value area with the switching frequency of said power supply unit and with said a frequency range which is impacted by said power supply unit.

10. A method according to claim 1, further comprising:
looking up said determined switching frequency in a predetermined information list, said list including information relating to predetermined types of power supply units and their associated switching frequencies, thereby identifying said type of said power supply unit.

11. A method according to claim 10, further comprising:
forwarding information regarding said type of power supply unit by said remote computing means to at least one client device on said client site.

12. A method according to claim 10, further comprising:
storing said switching frequencies for use in network management purposes.

13. A remote computing means for detecting electromagnetic interference on a data transmission line of a communication network, in particular for electromagnetic interference caused by a power supply unit located at a client site, said power supply unit comprising:
a switching converter, including,
a reception means for receiving power spectrum measurements for a noise signal on a transmission line as a function of frequency for a predetermined frequency range from said client site, said noise signal being present when said transmission line is not carrying a data signal; and a calculation means for determining periodicities in said power spectrum measurements and for determining the switching frequency of said power supply unit, based on periodicities in said power spectrum.

14. A remote computing means according to claim 13, further comprising:

a means for looking up said determined switching frequency in a predetermined information list, said list including information relating to predetermined types of power supply units and their associated switching frequencies, thereby identifying said type of said power supply unit.

15. A remote computing means according to claim 13, further comprising:

a means for forwarding information regarding said type of power supply unit to at least one client device.

\* \* \* \* \*